(12) United States Patent
Rahman et al.

(10) Patent No.: US 9,893,958 B2
(45) Date of Patent: Feb. 13, 2018

(54) METHOD AND SYSTEM FOR SERVICE ASSURANCE AND CAPACITY MANAGEMENT USING POST DIAL DELAYS

(75) Inventors: Moshiur Rahman, Marlboro, NJ (US); Paritosh Bajpay, Edison, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1303 days.

(21) Appl. No.: 12/645,815

(22) Filed: Dec. 23, 2009

(65) Prior Publication Data

US 2011/0149726 A1 Jun. 23, 2011

(51) Int. Cl.
| | | |
|---|---|---|
| H04L 12/26 | (2006.01) | |
| H04L 12/24 | (2006.01) | |
| H04W 28/18 | (2009.01) | |
| H04W 24/08 | (2009.01) | |
| H04W 48/18 | (2009.01) | |
| H04W 80/10 | (2009.01) | |

(52) U.S. Cl.
CPC ...... *H04L 41/5035* (2013.01); *H04L 41/5025* (2013.01); *H04L 43/0852* (2013.01); *H04W 28/18* (2013.01); *H04W 24/08* (2013.01); *H04W 48/18* (2013.01); *H04W 80/10* (2013.01)

(58) Field of Classification Search
USPC ....... 370/216, 218, 225, 229, 230, 235, 241, 370/242, 244, 245, 252, 310, 328, 329, 370/332, 333, 437, 465
See application file for complete search history.

(56) References Cited

U.S. PATENT DOCUMENTS

| | | | |
|---|---|---|---|
| 7,881,189 B1* | 2/2011 | Bajpay .................. | H04L 41/147 370/217 |
| 2008/0076385 A1* | 3/2008 | Mayer et al. ................. | 455/407 |
| 2009/0240366 A1* | 9/2009 | Kaushal et al. .............. | 700/110 |
| 2010/0284267 A1* | 11/2010 | Domingguez Romero ............... | H04W 76/027 370/216 |

* cited by examiner

*Primary Examiner* — Yemane Mesfin
*Assistant Examiner* — Mon Cheri Davenport
(74) *Attorney, Agent, or Firm* — Fay Kaplun & Marcin, LLP

(57) ABSTRACT

A computer readable storage medium stores a set of instructions operable by a processor. The set of instructions is operable to determine a metric related to connection delays in a network; determine a level of service degradation for a selected one of a plurality of mechanisms for accessing the network; and instruct a user equipment to use a further one of the plurality of mechanisms, if the level of service degradation for the selected one of the plurality of mechanisms is greater than a predetermined degradation threshold.

17 Claims, 2 Drawing Sheets

METHOD AND SYSTEM FOR SERVICE ASSURANCE AND CAPACITY MANAGEMENT USING POST DIAL DELAYS

BACKGROUND

Users of mobile telecommunications devices may have a plurality of mechanisms by which their devices may be capable of accessing communications networks. Periodically, one of such a plurality of mechanisms may experience service degradation, such as due to high levels of traffic or equipment failures. In such a situation, it may be advantageous to direct network traffic to mechanisms other than one that is experiencing service degradation.

SUMMARY OF THE INVENTION

A computer readable storage medium stores a set of instructions operable by a processor. The set of instructions is operable to determine a metric related to connection delays in a network; determine a level of service degradation for a selected one of a plurality of mechanisms for accessing the network; and instruct a user equipment to use a further one of the plurality of mechanisms, if the level of service degradation for the selected one of the plurality of mechanisms is greater than a predetermined degradation threshold.

A computer readable storage medium stores a set of instructions operable by a processor. The set of instructions is operable to receive a metric related to connection delays in a network; determine a level of service degradation for a selected one of a plurality of mechanisms for accessing the network; and instruct a user equipment to use a further one of the plurality of mechanisms, if the level of service degradation for the selected one of the plurality of mechanisms is greater than a predetermined degradation threshold.

A network device includes a memory and a processor. The processor is configured to receive a metric related to connection delays in a network. The processor is further configured to determine a level of service degradation for a selected one of a plurality of mechanisms for accessing the network. The processor is further configure to instruct a user equipment to use a further one of the plurality of mechanisms, if the level of service degradation for the selected one of the plurality of mechanisms is greater than a predetermined degradation threshold.

DETAILED DESCRIPTION

Figure 1:
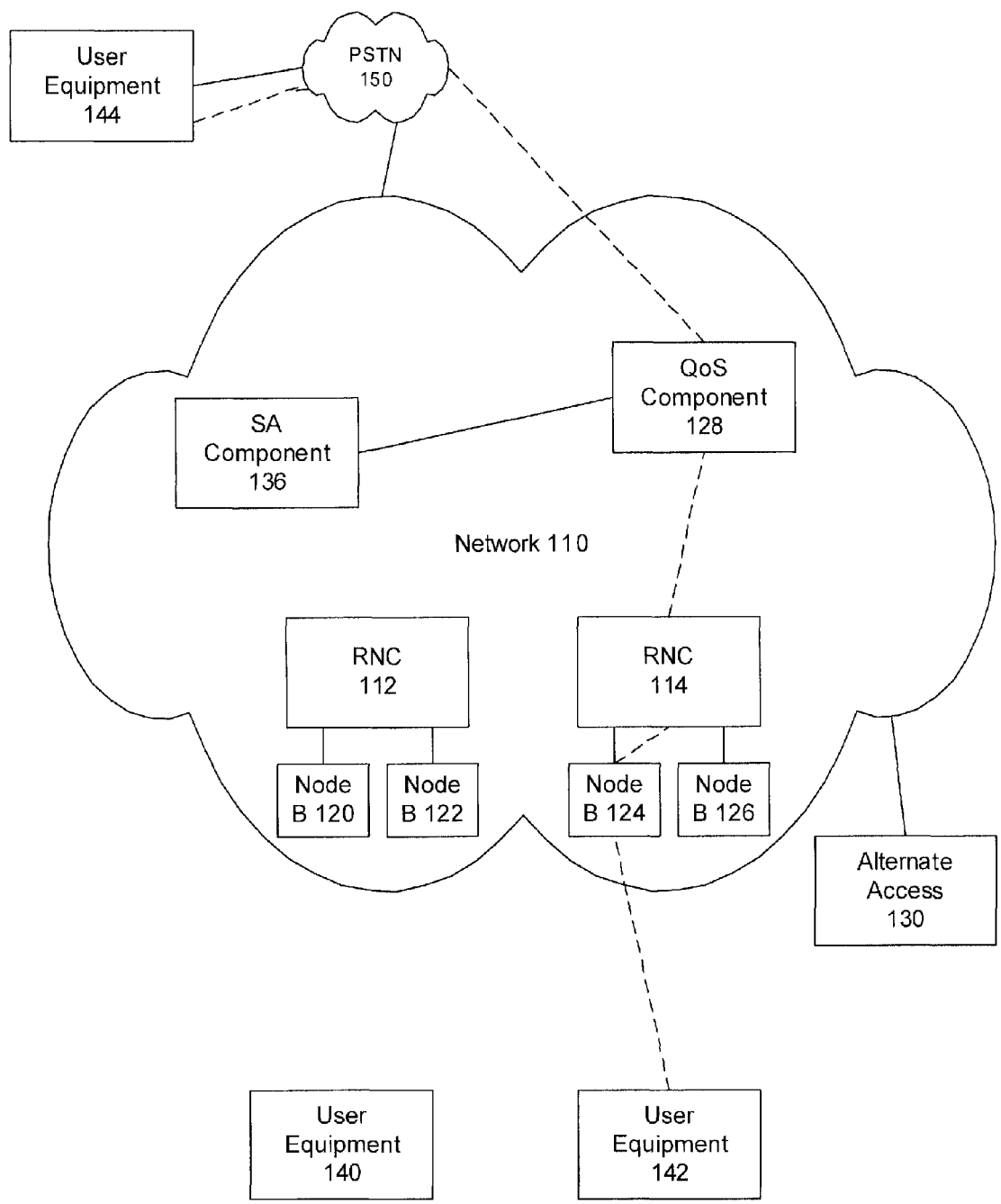
FIG. 1 shows an exemplary communications system.

The exemplary embodiments may be further understood with reference to the following description and the appended drawings, wherein like elements are referred to with the same reference numerals. The exemplary embodiments describe methods and systems for fault prediction and capacity management based on existing delays in call setup.

Mobile telecommunications devices may be capable of accessing a communications network via a plurality of access methods. This may include, for example, terrestrial radio access network ("RAN"), satellite RAN, etc. When devices experience delays in connecting to a network, this may be due to delays in the network itself, or delays in the specific access method being used by the device. In situations' where delays relate to a specific access method, it may be desirable to instruct devices to use another access method and thus avoid such delays.

FIG. 1 illustrates an exemplary system 100. The system 100 includes a network 110 (e.g., a telecommunications network) that may be an IP based network. The IP network 110 is shown as including radio network controllers (RNC) 112 and 114 and Node B components 120, 122, 124 and 126. The IP network 110 also includes Quality of Service (QoS) component 128 and a Service Assurance (SA) component 136. Those skilled in the art will understand that an IP network may include many other components generally referred to as network elements for performing the functionalities associated with the network and the network elements illustrated in FIG. 1 are only exemplary. It should be noted that the network elements for the IP network 110 may be hardware components such as routers, etc. and may also be software components that are executed on computing devices. For example, the QoS component 128 may be a software program that is executed on a hardware server device that is within the IP network 110.

In addition, the system 100 also includes user equipment (UE) 140, 142 and 144. The user terminals may include any type of hardware suitable for connection to the network 110, such as mobile phones, smart phones, mobile computers, etc. The PSTN phone network 150 is also illustrated in FIG. 1. An alternate access network 130 for accessing the IP network 110 is also illustrated. Each of these components will be described in greater detail below.

Initially, a connection (e.g., a phone call) between the UE 144 and the UE 142 is described. The connection is illustrated in FIG. 1 via the dashed line. It should be noted that UE 144 or UE 142 may have initiated the connection. As shown by the dashed line, the UE 142 has a radio link with the Node B component 124 to establish a link with the IP network 110. Within the IP network 110, the connection includes the RNC 114 and the QoS component 128. As described above, many other network elements, e.g., routers, network gateways, etc., may also be included within the IP network 110 and may be part of the connection. The connection then extends from the IP network 110 to the PSTN 150 and terminates at the UE 144.

Within the IP network, a signaling protocol may be used to establish the connection. One example of a signaling protocol is the Session Initiated Protocol (SIP). The exemplary embodiments are not limited to the SIP protocol, but may also implement other protocols that provide similar information as the SIP protocol. As part of setting up a connection using the SIP protocol, the QoS component 128 may determine the SIP Post Dial Delay (PDD) for the connection. Each network element (e.g., Node B 124, RNC 114, etc.) involved in SIP call processing will keep track of the SIP transaction messages is a SIP call is being set up. Each of these network elements may report this information to the QoS component 128. The QoS component 128 will collect all the information from the network elements and may then report this information to the SA component 136 which may then calculate the delay in call setup, i.e., the PDD. In addition, the SA component 136 can also pinpoint each network element's contribution to the total PDD. Thus, the SA component will have knowledge of each network element's operation status and service degradation condition.

The SA component 136 may then send this information to one or more of the RNCs 112 and 114 which may broadcast this data to the corresponding Node B components, 120, 122, 124, 126. The RNCs 112 and 114 may then make determinations about its total capacity and the needed quality of service to handle new calls or handoff calls. The needed quality of service may be defined by a Service Level Agreement (SLA) for each customer. For example, the customer associated with the UE 142 may have a particular SLA which defines the quality of service and other parameters that have been guaranteed to that customer. The SA component 136 or the RNCs 112 and/or 114 may have this information so that they can determine the quality of service and other parameters guaranteed to the customer. If the RNC 112 or 114 determines that there is a degradation of the network elements based on the determined PDD such that the RNC cannot deliver the quality of service guaranteed the customer, the RNC may then instruct the UE (e.g., UE 142) to use a different access method. For example, if the UE 142 is currently using the terrestrial RAN to access the network 110, the RNC 114 may instruct the UE 142 to access the network 110 via the alternate access 130 which may be, for example, the satellite based RAN.

Figure 2:
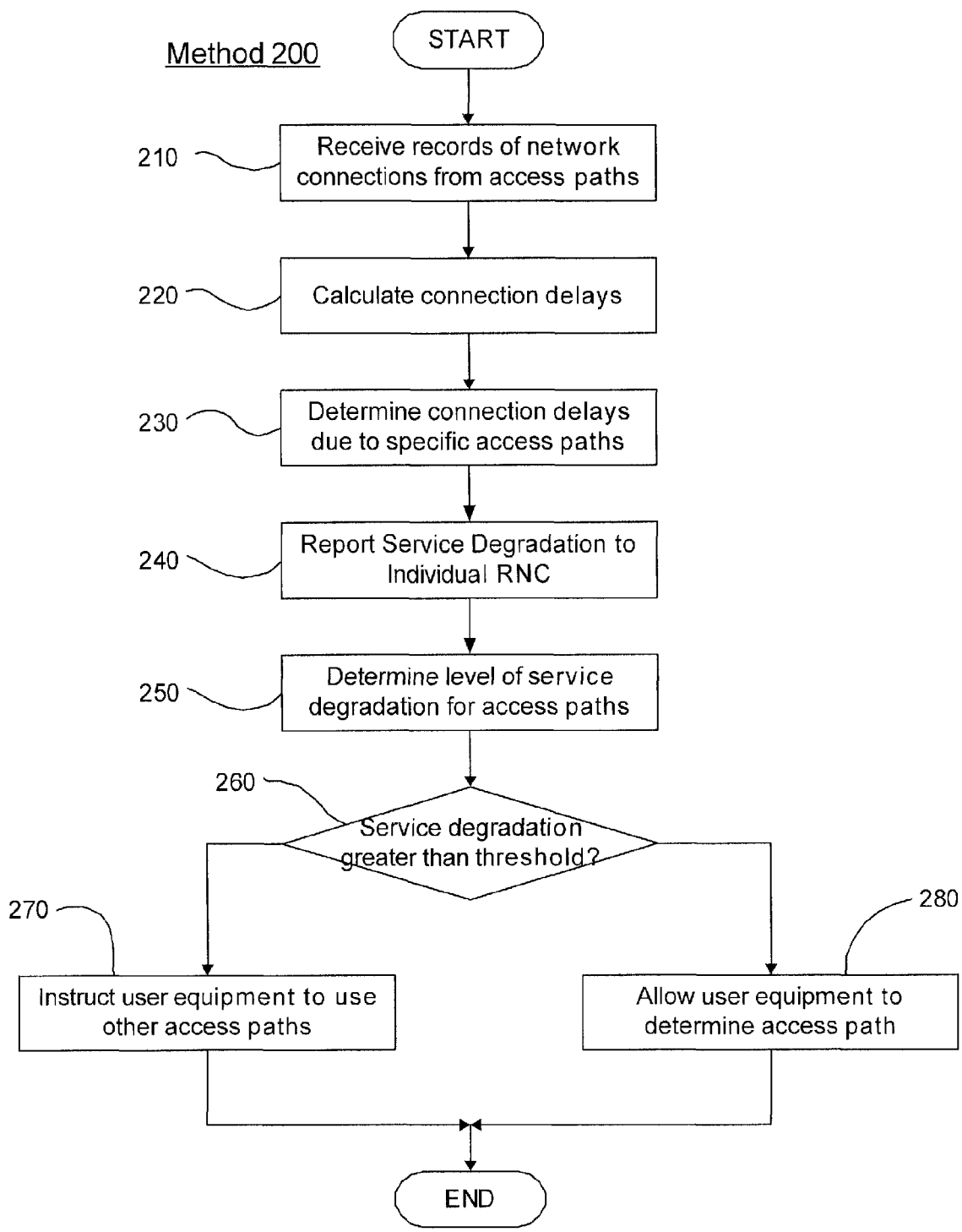
FIG. 2 shows an exemplary method for providing call routing using the exemplary system of FIG. 1.

FIG. 2 illustrates an exemplary method 200 by which operation of a network may be coordinated. The method 200 will be described specifically with reference to the exemplary system 100, but those of skill in the art will understand that it may apply equally to other types of networks that may be accessed by more than mechanism. The description of the method 200 will occur at a point when the UE 142 and other UE's (not shown) are accessing the IP network 110 via the terrestrial RAN via Node B components 124 and 126, and the UE 140 is attempting to initiate access to the IP network 110 or attempting to handoff a call via the Node B components 124 or 126 and RNC 114.

In step 210, the SA component 136 receives, from the QoS component 128, records associated connections in the IP network 110, e.g., the SIP transaction messages related to call set-ups. Records may be provided specifically for this purpose, or may be a subset of a broader set of records provided for more generalized network maintenance tasks. Again, as described above, the SIP transaction messages are used as an example, but any protocol that generates the type of information described herein may be used with the exemplary embodiments. In step 220, the SA component 136 calculates connection delays based on the records received in step 210. In one exemplary embodiment, this may be the PDD described above.

In step 230, SA component 136 determines, based on the connection delays calculated in step 220, portions of delays due to each of the specific network elements in the IP network 110. This may include delays due to equipment failures for the access paths, delays due to general congestion, etc. In step 240, the SA component 136 provides the PDD data to the RNC 114 and any other RNCs within the IP network 110.

In step 250, the RNC 114 determines a level of service degradation and/or its total capacity and the needed quality of service to handle new calls and/or handoff calls as a function of the delays determined in step 230. In step 260, the RNC 114 determines whether the levels of degradation determined in step 260 are above a predetermined degradation threshold. As described above, this threshold may be set based on the SLA of the customer. Thus, in this example, the SLA of the customer for UE 140 is relevant because the UE 140 is attempting to connect to the IP network 110.

If degradation of one network access path is above the threshold, then in step 260, the RNC 114 instructs the UE 140 to use an access path or paths other than the path suffering from degradation above the threshold, e.g., the alternate access 130. If no degradation above the threshold is determined to exist, then in step 280 the RNC 114 allows the UE 140 to access the IP network 110 via the Node B components 124 or 126, e.g., the terrestrial RAN. After this determination has been made in step 260 and acted upon in step 270 or 280, the method terminates. However, those skilled in the art will understand that the method 200 may be performed continuously within the IP network 110 and, as conditions change, the RNCs will direct the UEs to access the IP network 110 as deemed appropriate.

The exemplary embodiments may thus enable traffic to be routed away from access paths that are experiencing service degradation and toward access paths that are performing at acceptable levels. As a result, a communications network overall network may be made more robust, capacity may be efficiently managed, and user experience may be enhanced as devices attempt to access networks using connection paths that are performing well rather than those that are performing poorly.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium storing a set of instructions operable by a processor, the set of instructions performing a method comprising:
   determining a metric related to connection delays in a network;
   determining a level of service quality degradation for a selected one of a plurality of mechanisms for accessing the network, the level of service quality degradation for the selected one of the plurality of mechanisms being a portion of the metric, the portion corresponding to the selected one of the plurality of mechanisms, the portion being determined based on call setup records for the plurality of mechanisms and delays due to equipment failures for each of the plurality of mechanisms, wherein the plurality of mechanisms include a terrestrial radio access network and a satellite access network; and
   instructing a user equipment to use a further one of the plurality of mechanisms, if the level of service quality degradation for the selected one of the plurality of mechanisms is greater than a predetermined degradation threshold.

2. The non-transitory computer readable storage medium of claim 1, wherein the metric related to connection delays includes a plurality of metrics, each metric related to a network element in the network.

3. The non-transitory computer readable storage medium of claim 1, wherein the connection delays are post dial delays.

4. The non-transitory computer readable storage medium of claim 3, wherein the post dial delays are determined based SIP transactions messages.

5. The non-transitory computer readable storage medium of claim 1, wherein the method further comprises:
   determining the predetermined degradation threshold based on a service level agreement associated with the user equipment.

6. A non-transitory computer readable storage medium storing a set of instructions operable by a processor, the set of instructions performing a method comprising:
   receiving a metric related to connection delays in a network;

determining a level of service quality degradation for a selected one of a plurality of mechanisms for accessing the network, the level of service quality degradation for the selected one of the plurality of mechanisms being a portion of the metric, the portion corresponding to the selected one of the plurality of mechanisms, the portion being determined based on call setup records for the plurality of mechanisms and delays due to equipment failures for each of the plurality of mechanisms, wherein the plurality of mechanisms include a terrestrial radio access network and a satellite access network; and instructing a user equipment to use a further one of the plurality of mechanisms, if the level of service quality degradation for the selected one of the plurality of mechanisms is greater than a predetermined degradation threshold.

7. The non-transitory computer readable storage medium of claim 6, wherein the method further comprises:

determining a total capacity of a network element; and determining a needed capacity for the network element, wherein the level of service quality degradation is based on the total capacity and the needed capacity.

8. The non-transitory computer readable storage medium of claim 6, wherein the method further comprises:

determining the predetermined degradation threshold based on a service level agreement associated with the user equipment.

9. The non-transitory computer readable storage medium of claim 6, wherein the metric related to connection delays includes a plurality of metrics, each metric related to a network element in the network.

10. The non-transitory computer readable storage medium of claim 6, wherein the connection delays are post dial delays.

11. The non-transitory computer readable storage medium of claim 10, wherein the post dial delays are determined based SIP transactions messages.

12. A network device, comprising:

a memory storing a set of instructions; and a processor executing the set of instructions to perform a method comprising:

receiving a metric related to connection delays in a network;

determining a level of service quality degradation for a selected one of a plurality of mechanisms for accessing the network, the level of service quality degradation for the selected one of the plurality of mechanisms being a portion of the metric, the portion corresponding to the selected one of the plurality of mechanism, the portion being determined based on call setup records for the plurality of mechanisms and delays due to equipment failures for each of the plurality of mechanisms and delays due to equipment failures for each of the plurality of mechanisms, wherein the plurality of mechanisms include a terrestrial radio access network and a satellite access network; and instructing a user equipment to use a further one of the plurality of mechanisms, if the level of service quality degradation for the selected one of the plurality of mechanisms is greater than a predetermined degradation threshold.

13. The network device of claim 6, wherein the method further comprises determining a total capacity of a network element and determine a needed capacity for the network element, wherein the level of service quality degradation is based on the total capacity and the needed capacity.

14. The network device of claim 12, wherein the method further comprises determining the predetermined degradation threshold based on a service level agreement associated with the user equipment.

15. The network device of claim 12, wherein the metric related to connection delays includes a plurality of metrics, each metric related to a network element in the network.

16. The network device of claim 12, wherein the connection delays are post dial delays.

17. The network device of claim 16, wherein the post dial delays are determined based SIP transactions messages.

* * * * *